United States Patent [19]
Ryan et al.

[11] Patent Number: 5,639,243
[45] Date of Patent: Jun. 17, 1997

[54] TRAINING APPARATUS, METHOD FOR TRAINING AN ATHLETE, AND METHOD FOR PRODUCING A TRAINING DEVICE

[76] Inventors: Nolan Ryan, 2900 S. Gordon, Alvin, Tex. 77511; Lyle Yates, 7450 Northrup Dr., San Diego, Calif. 92126; Thomas R. House, 12794 Via Felino, Del Mar, Calif. 92014

[21] Appl. No.: 429,085

[22] Filed: Apr. 26, 1995

[51] Int. Cl.⁶ .............. G09B 19/00; A63B 69/00
[52] U.S. Cl. .............. 473/451
[58] Field of Search .............. 434/247, 258; 273/26 R, 26 A, 25, 26 E, 26 EA, 29 A, 55 B, 57.2, 57.3; 482/20, 83, 115, 137

[56] References Cited

U.S. PATENT DOCUMENTS

| | | | |
|---|---|---|---|
| 1,962,087 | 6/1934 | Cone | 273/26 R |
| 4,175,744 | 11/1979 | Llewellyn | 273/26 E |
| 5,087,039 | 2/1992 | Laseke | 273/26 R |

Primary Examiner—Jeffrey A. Smith
Attorney, Agent, or Firm—Brown, Martin, Haller & McClain

[57] ABSTRACT

A starting pad, a landing pad and a target are spaced along a beam. The device may be used to train an athlete, such as a baseball pitcher, to accurately repeat a sequence of coordinated leg, arm and torso movements. The athlete stands on the starting pad and grips a suitable striking implement, such as a hand towel. The athlete executes a sequence of movements in the manner required by the sport, beginning with the athlete stepping off the starting pad and ending with the athlete stepping onto the landing pad. During the movement sequence, the athlete swings the implement in the manner of the sport to which the sequence pertains and attempts to strike the target with the implement. For example, a baseball pitcher begins a delivery with a leg lift on the starting pad and strides to the landing pad while swinging the implement as though it were a baseball in an attempt to strike the target. A generally vertical posture guide, such as a mesh screen, may also be placed along the beam to constrain the athlete's upper torso movement.

31 Claims, 2 Drawing Sheets

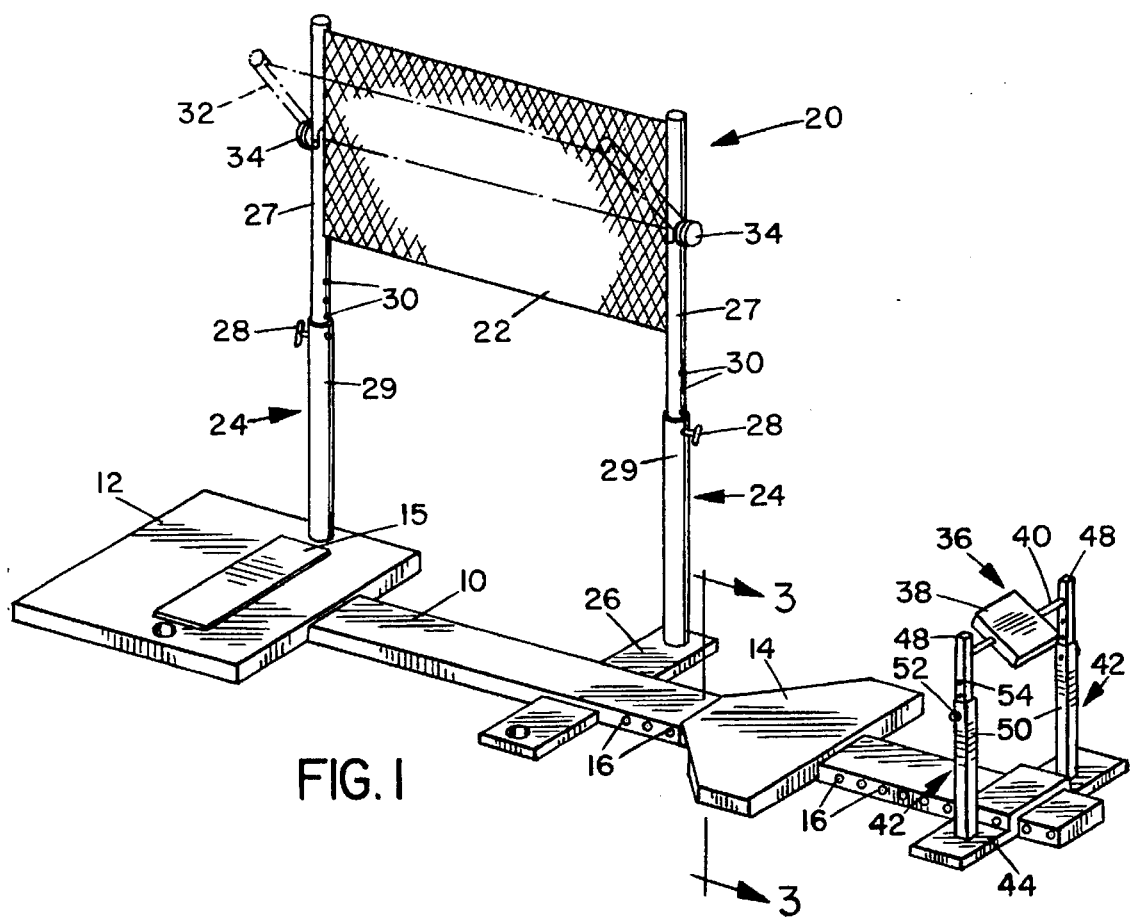
FIG. 1
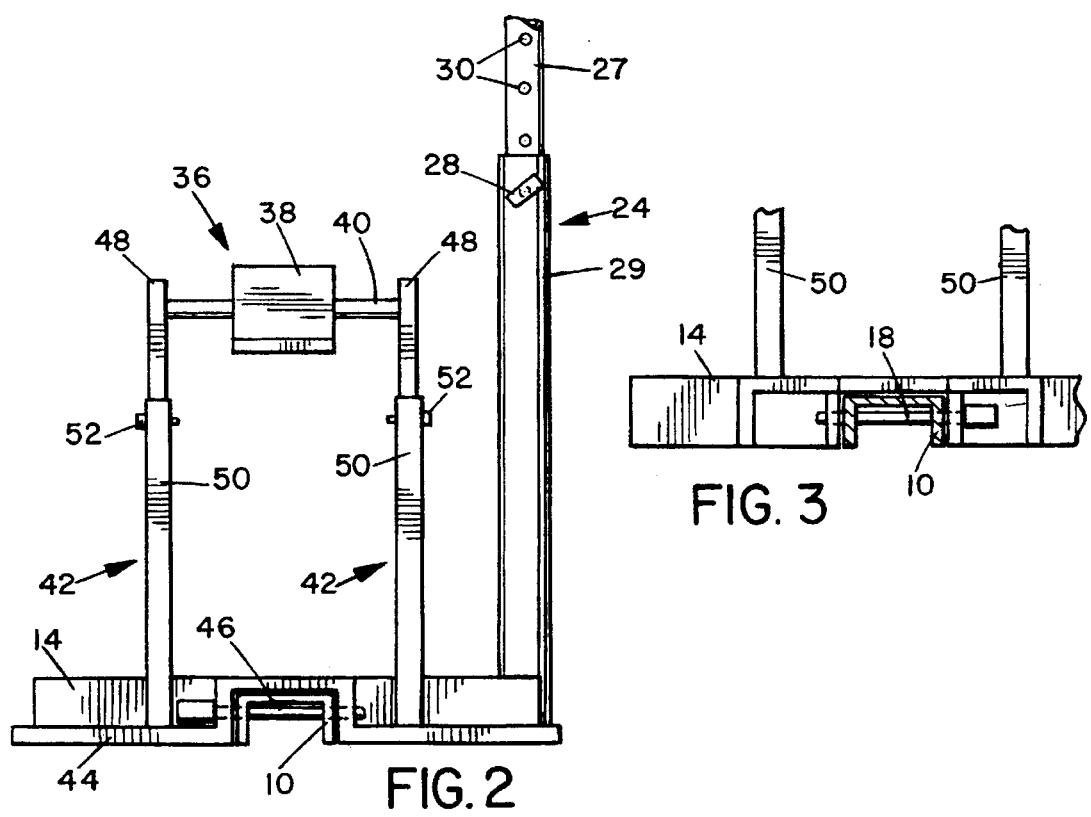
FIG. 2
FIG. 3

TRAINING APPARATUS, METHOD FOR TRAINING AN ATHLETE, AND METHOD FOR PRODUCING A TRAINING DEVICE

BACKGROUND OF THE INVENTION

The present invention relates generally to training devices and methods for athletes and, more specifically, to a device and method for improving an athlete's skill at sports tasks involving arm and torso movements, such as baseball pitching.

An athlete may improve his skill in a sport by repeating a biomechanically correct movement or sequence of movements that pertain to that sport until he masters them. A movement is biomechanically correct if it is the optimal and otherwise most efficient manner in which the athlete can perform the movement with minimal risk of injury. The biomechanically correct movement is unique to an individual. For example, although two baseball pitchers may pitch equally well, one may have a longer stride or a higher leg lift than the other. Training methods and devices must therefore accommodate the individual athlete's needs. They must also provide proper feedback to constrain the athlete to the correct movement.

Pitching a baseball involves a complex sequence of movements known as the delivery. The delivery includes a leg lift, a stride, and a rotation of the hips and torso when the forward foot strikes the ground. The pitcher's throwing arm winds up and arcs forward during these movements and releases the baseball at a point during the rotation.

It is known that a baseball pitcher may improve his pitching using a "stride beam." A stride beam comprises a beam or plank approximately five or six feet in length and six inches in width having a starting platform and a landing platform spaced apart on the a beam by a distance approximately equal to the pitcher's stride length. Beginning on the starting platform, the pitcher executes a delivery, ending with his forward or stride foot striking the landing platform. The starting platform may include a simulated pitcher's rubber. The stride beam improves a pitcher's skill by constraining the pitcher's stride direction and foot strike position.

It is known that a baseball pitcher may use a "towel drill" to improve his delivery. The pitcher, standing as he would prior to beginning a delivery, wraps his middle finger around the center of a small hand towel that has been gathered or rolled into an elongated shape. A second person kneels at a distance from the pitcher approximately five or six feet greater than the length of the pitcher's stride. The second person extends his arm outwardly toward the pitcher with his palm facing upwardly. The pitcher then performs a complete delivery as though the towel were a baseball, attempting to strike the second person's palm with the towel as his arm arcs downwardly past the point where he would have released the baseball. The snapping sound and feel of the towel as it strikes the person's palm provides aural and tactile feedback to the pitcher. If the delivery is performed improperly, the towel will generally fail to strike the person's palm. It has been observed that a pitcher's ability to consistently strike the person's palm with the towel is related to his pitching accuracy, i.e., his ability to consistently throw a baseball into the strike zone. The towel drill is also believed to provide resistance training for arm muscles because the towel experiences air resistance as the pitcher swings it. It is also believed that the drill improves arm speed.

Persons familiar with the towel drill have not, however, developed a method for improving a pitcher's skill in striking the palm with the towel. Striking the palm is merely an indication that the delivery was properly performed. It would be desirable to provide a system and method for improving a pitcher's accuracy. These problems and deficiencies are clearly felt in the art and are solved by the present invention in the manner described below.

SUMMARY OF THE INVENTION

The present invention is an apparatus comprising a starting pad, a landing pad and a target, and a method for using the apparatus for training an athlete. The training method involves the athlete executing a sequence of body movements within the constraints imposed by the apparatus. The constraints provide the athlete with feedback and skill training as well as resistance training. The movement sequence is dependent upon the athlete's sport. For example, a baseball pitcher may execute a movement sequence that simulates throwing a baseball. Nevertheless, the invention may be used for any other sport in which the movement sequence includes coordinated arm and leg movement along a generally linear path, including racquet sports and all sports in which a ball is thrown, pitched, bowled or hurled.

In an exemplary embodiment, the starting and landing pad are generally planar platforms. The platforms are mounted on an elongated beam at a predetermined spacing. (The word "beam" is used solely for convenience and is not intended to convey limitations regarding shape, dimensions or materials.) In the exemplary embodiment, the beam has a rectangular cross-section. The beam may include multiple mounting positions to allow a person to adjust the spacing. Nevertheless, in accordance with the method of the present invention, the platforms may be spaced in any other suitable manner, such as by placing them on a common surface at the predetermined spacing.

The starting pad and landing pad indicate the respective positions at which the athlete starts and finishes the delivery. (The word "pad" is used solely for convenience and is not intended to convey limitations regarding shape, dimensions or materials.) The starting and landing pads may be made of any suitable material and may have any suitable surface features and textures. They may comprise board-like or sheet-like platforms or block-like structures. For example, the starting pad may consist of a board on which a pitcher's rubber is mounted. Although in an exemplary embodiment, the pads support the athlete, in other embodiments they may comprise boundary markers that delimit the zone in which the athlete stands or steps but are not themselves stepped upon. Such marker-like starting and landing pads may, for example, comprise flexible tapes or aggregations of particles or pigments. The shape, dimensions, materials and other features of the starting pad may be different from those of the landing pad.

The target includes a portion that is supported above the starting and landing pads. In an exemplary embodiment, the target comprises a rotatable strike pad mounted on an axle approximately level with the athlete's waist or abdomen.

To use the system, the athlete stands on the starting pad and grips a suitable striking implement, such as a towel. The athlete executes a sequence of one or more movements in the manner required by the sport, beginning with the athlete stepping off the starting pad and ending with the athlete stepping with at least one foot onto the landing pad. During the movement sequence, the athlete swings the implement in the manner used in the sport and attempts to strike the target with the implement. For example, a baseball pitcher begins a delivery with a leg lift on the starting pad and strides to the landing pad while swinging the implement as though it were a baseball in an attempt to strike the target. In embodiments in which the target is rotatable, the target rotates or spins in response to being struck with the implement. The spinning target provides immediate and satisfying visual, aural and tactile feedback to the athlete. The extent to which the target spins is proportional to the force it experiences. In most sports, it is desirable to maximize the transfer of force from the athlete's arm to the implement.

The invention may further comprise a posture guide. The posture guide may have any suitable shape and may be made of any suitable material, such as mesh screening. It may be disposed in any suitable orientation between the starting and landing pads to constrain the athlete's movement. For example, as a baseball pitcher comes out of a leg lift and into a stride, the pitcher's upper body begins to tilt or hunch over with respect to vertical. Although the optimal tilt angle is dependent upon the individual pitcher's biomechanical profile, the pitcher should not vary the angle during training once the individual's biomechanically correct angle has been determined. To constrain the pitcher to this angle, a posture guide having a generally planar shape may be placed in an orientation parallel to the beam at an acute angle with respect to a plane connecting the starting and landing pads. Nevertheless, the shape and orientation of the posture guide may be adapted to suit the needs of athletes training for other sports.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 is a perspective view of a pitching training device;

FIG. 2 is an end view of the device shown in FIG. 1;

FIG. 3 is a sectional view taken on line 3—3 of FIG. 1;

DESCRIPTION OF A PREFERRED EMBODIMENT

Figure 4:
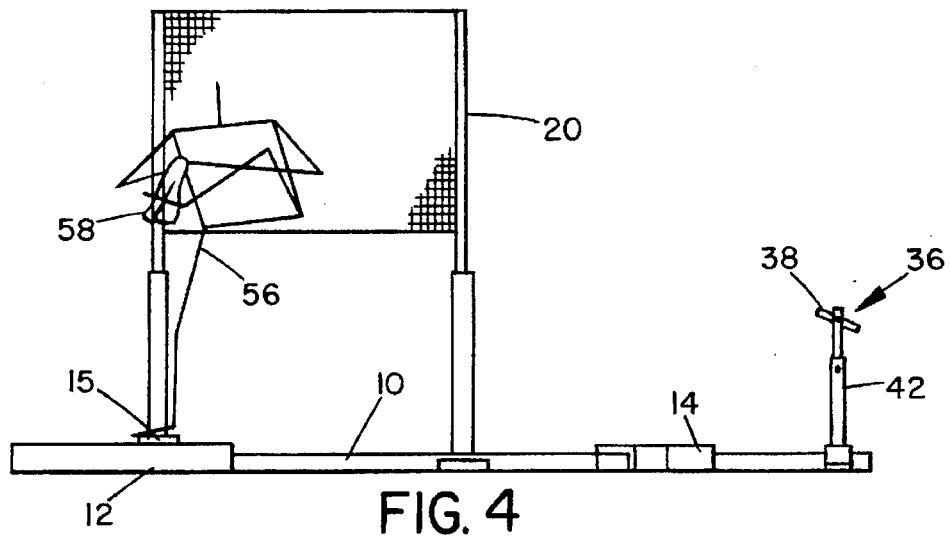
FIG. 4 is a side elevation view of the device, showing a stick-figure representation of a baseball pitcher beginning a delivery using the device.

In the illustrated embodiment, the present invention is preferably used for training baseball pitchers. As illustrated in FIG. 1, a beam 10 connects a starting platform 12 to a landing platform 14. A simulated pitcher's rubber 15 is mounted on starting platform 12. Beam 10 has a plurality of horizontally spaced mounting holes 16 for adjusting the position of landing platform 14 along the length of beam 10. As illustrated in FIG. 3, a pin 18 is insertable through a hole in landing platform 14 and one of holes 16 to retain landing platform 14 at a selected horizontal position on beam 10.

A posture guide 20 comprises a mesh screen 22 suspended between two upright posture guide support posts 24, one of which is removably mounted on starting platform 12 and the other of which is removably mounted on a posture guide support post mounting 26 connected to beam 10 at a position between starting platform 12 and landing platform 14. Although posture guide 20 is illustrated in FIG. 1 mounted on a side of beam 10 to accommodate right-handed pitchers, it may be easily removed and mounted on the other side of beam 10 to accommodate left-handed pitchers.

Each posture guide support post 24 has an inner posture guide support section 27 that is vertically slidable within an outer posture guide support section 29 for adjusting the height of screen 22. As illustrated in FIGS. 1 and 2, inner posture guide support section 27 has a plurality of vertically spaced screen height adjustment holes 30. A pin 28 is insertable through a hole in outer posture guide support section 29 and through one of screen height adjustment holes 30 to retain screen 22 at a selected height.

An upper portion 32 of screen 22 is angularly adjustable with respect to the plane connecting starting platform 12 and landing platform 14. Each posture guide support post 24 has an angle adjustor 34 at a point along its length that preferably operates in a manner similar to ratcheting adjustments commonly used on patio chaise lounges. The portion of posture guide support post 24 above angle adjustor 34 can be pivoted about angle adjustor 34 with respect to the remainder of posture guide support post 24. At any selected position, such as that shown in phantom line in FIG. 1, upper portion 32 remains locked in place by the ratcheting mechanism of angle adjustor 34. To decrease the angle, i.e., to position upper portion 32 in a more vertical orientation, upper portion 32 may be pivoted directly to that position, where it will remain locked in place by the ratcheting mechanism. To increase the angle, i.e., to position upper portion 32 in a less vertical orientation, upper portion 32 should first be pivoted to the extreme vertical orientation to unlock the ratchet, then pivoted in the opposite direction to the opposite extreme position, and then pivoted back toward the vertical orientation until it reaches the desired position, where it will remain locked in placed by the ratcheting mechanism. Persons of skill in the art will readily be capable of designing or obtaining a suitable angle adjustor 34. Other angle adjustors, such as those having a threaded bolt and/or nut that frictionally retain upper portion 32, may also be suitable.

A target 36 comprises a strike pad 38 rotatably mounted on an axle 40 that extends between two upright target support posts 42. Target support posts 42 are mounted on a target mounting 44 that can be positioned along the length of beam 10 in a manner similar to that in which landing platform 14 is positioned. As illustrated in FIG. 2, a pin 46 is insertable through a hole in target mounting 44 and through one of holes 16 to retain target 36 at a selected horizontal position on beam 10.

Each target support post 42 has an inner target support section 48 that is vertically slidable within an outer target support section 50 for adjusting the height of target 36. As illustrated in FIGS. 1 and 2, inner target support section 48 has a plurality of vertically spaced target height adjustment holes 54. A pin 52 is insertable through a hole in outer target support section 50 and through one of target height adjustment holes 54 to retain target 36 at a selected height.

Figure 5:
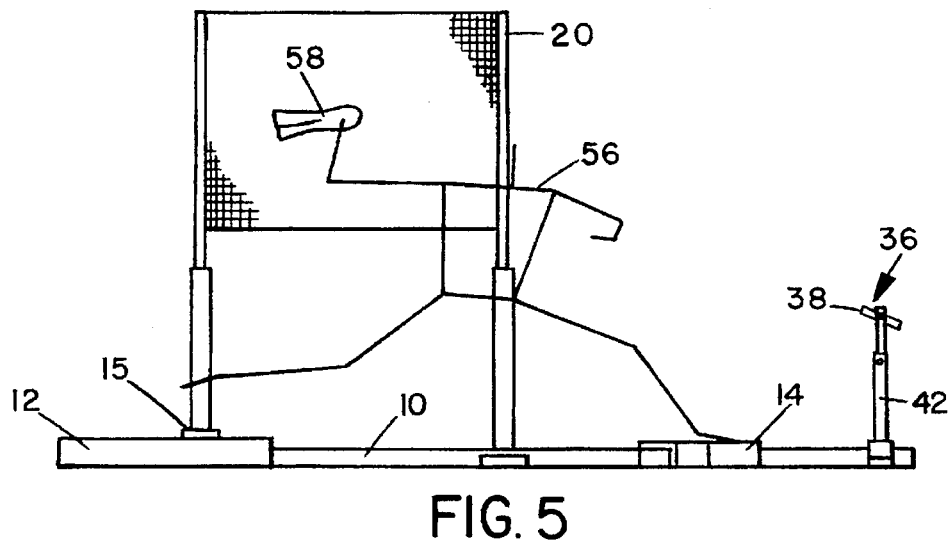
FIG. 5 is a view similar to FIG. 4, showing the pitcher continuing the delivery.
Figure 6:
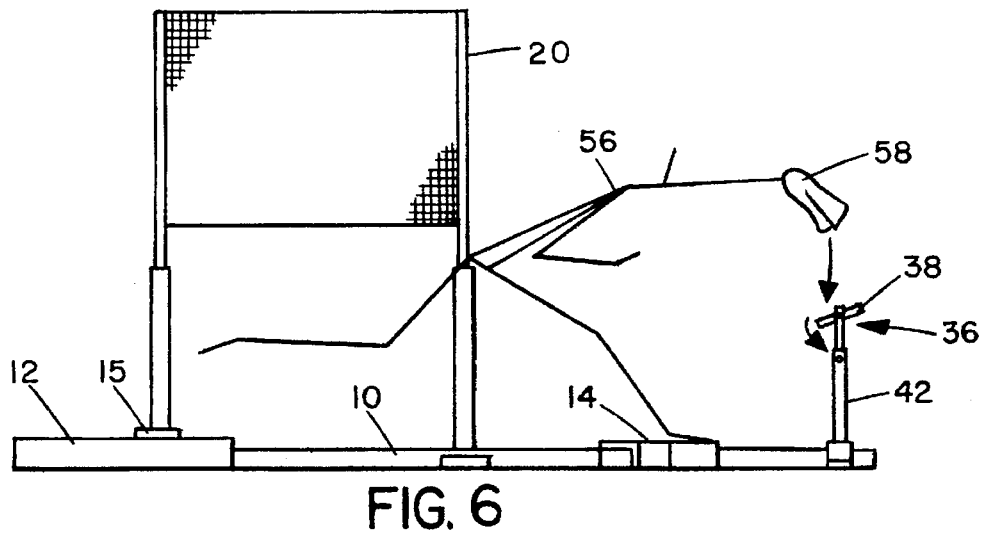
FIG. 6 is a view similar to FIGS. 4 and 5, showing the pitcher completing the delivery.

As illustrated in FIGS. 4–6, the present embodiment of the invention may be used to improve a baseball pitcher's delivery. A pitcher 56, represented by a stick-figure of the type with which persons skilled in computer-assisted biomechanics analysis will be familiar, is used to illustrate the motion sequence. The position of landing platform 14 should be adjusted to accommodate the stride length of the individual pitcher by positioning it on beam 10 at approximately the position where the pitcher is expected to end his stride, i.e., the foot-strike position. Target 36 should preferably be positioned horizontally on beam 10 approximately five feet from the foot-strike position. Target 36 should preferably be adjusted to position it vertically at approximately the height of the pitcher's belly-button. Posture guide 20 is preferably initially adjusted to an angle that best approximates the angle of a pitcher's body when it comes out of the leg lift and begins the stride, such as 20–30 degrees from vertical. Re-adjustments may be made after the pitcher has attempted several deliveries, as described below.

As illustrated in FIG. 4, pitcher 56 begins the delivery by standing on starting platform 12 and grasping a hand towel 58 with the middle finger of his pitching arm. Pitcher 56 stands with his back facing posture guide 20. Pitcher 56 positions himself on pitcher's rubber 15 in the "set" position that pitcher 56 would normally use in actually pitching a baseball. Pitcher 56 then enters the leg-lift and, as the leg is lowered, strides forward along beam 10 with the lifted leg and plants that leg on landing platform 14, as illustrated in FIG. 5. Pitcher 56 should begin rotating his torso when his foot reaches approximately 75 percent of stride. As illustrated in FIG. 6, pitcher 56 continues with the delivery after foot-strike, following through with his pitching arm and towel 58. If the delivery is correct, towel 58 will strike target 36, thereby rotating or spinning strike pad 38. Contacting strike pad 38 in this manner provides satisfying visual feedback because the speed with which it spins is indicative of the efficiency of the delivery. Contacting strike pad 38 also provides satisfying aural feedback because the contact produces a slapping noise. In addition, the air resistance experienced by towel 58 provides resistance training for relevant muscle groups.

The pitcher should perform several deliveries in the above-described manner to properly adjust the positions of landing platform 14, posture guide 20 and target 36. The horizontal positions of landing platform 14 and target 36 may be re-adjusted until foot-strike occurs squarely on platform 14 during deliveries that successfully result in towel 58 striking target 36. The height and angle of posture guide 20 may be re-adjusted to position it such that when deliveries consistently result in towel 58 striking target 36, the pitcher's back approaches within a few inches of posture guide 20 when the pitcher comes out of leg-lift and into stride. The proper angle for a pitcher's upper torso when coming out of leg-lift and into stride is that with which an individual pitcher both feels comfortable and is able to consistently throw accurate pitches. Nevertheless, once a pitcher determines this optimal posture, he should not deviate from it. The present invention uses feedback to teach a pitcher to avoid such deviation. Once a pitcher determines a torso angle or posture in which he is consistently able to strike target 36 with towel 58, posture guide 20 should be adjusted to shadow that posture. If the pitcher contacts posture guide 20 after posture guide 20 has been so adjusted, it is likely that the pitcher is changing his delivery and/or rotating too soon at foot-strike. Such deliveries will not consistently result in towel 58 striking target 36. By repeatedly performing deliveries using the device of the present invention, a pitcher can learn to maintain his optimal posture.

The above-described method for using the device is intended to illustrate the method of the present invention, as claimed herein, but it is not intended to constitute complete instruction for training individual pitchers. Persons interested in such instruction and further information on pitching biomechanics may refer to House, T., *The Pitching Edge*, Bio-Kinetics (Salt Lake City, 1994) or the companion video production of the same name, produced by Human Kinetics, Inc. of Champaign, Ill. (1994).

Obviously, other embodiments and modifications of the present invention will occur readily to those of ordinary skill in the art in view of these teachings. For example, the target and/or posture guide may be modified to facilitate training of athletes in sports other than baseball. Therefore, this invention is to be limited only by the following claims, which include all such other embodiments and modifications when viewed in conjunction with the above specification and accompanying drawings.

What is claimed is:

1. A training apparatus for an athlete, comprising:
    starting pad for indicating a position at which said athlete may begin a movement sequence;
    landing pad for indicating a position at which said athlete may complete said movement sequence;
    a target having a strike pad supported above a plane connecting said starting and landing pads; and
    a beam elongated in the direction of an axis and connected to said starting pad, said landing pad, and said target, with said starting pad, landing pad and target axially displaced from one another along said beam.

2. The training apparatus claimed in claim 1, wherein said beam has a generally planar upper surface.

3. The training apparatus claimed in claim 1, wherein said beam has plurality of mounting positions distributed along it at which said starting and landing pads are each removably mountable.

4. The apparatus claimed in claim 1, wherein said starting pad and said landing pad each comprises a platform having a planar surface for supporting at least a portion of the body of said athlete.

5. The apparatus claimed in claim 4, wherein said starting pad further comprises a simulated baseball pitcher's rubber.

6. The training apparatus claimed in claim 1, wherein said strike pad is rotatable about an axis parallel to said plane.

7. The training apparatus claimed in claim 6, wherein:
    said target comprises two target support posts;
    said strike pad has a generally planar shape; and
    said strike pad is disposed between said target support posts and rotates on an axle extending between said target support posts.

8. The training apparatus claimed in claim 7, wherein each said target support post comprises a height adjustor.

9. The training apparatus claimed in claim 1, further comprising a generally planar posture guide extending above said plane.

10. The training apparatus claimed in claim 9, wherein said posture guide comprises a mesh screen.

11. The training apparatus claimed in claim 9, wherein said posture guide comprises an angle adjustor for selectably orienting at least a portion of it at an angle with respect to said plane.

12. The training apparatus claimed in claim 11, wherein said angle adjustor comprises a ratcheting mechanism.

13. A training apparatus for an athlete, comprising:
    a starting pad indicating a position at which said athlete may begin a movement sequence;
    a landing pad selectably spaceable from said starting pad along an axis, said landing pad indicating a position at which said athlete may complete said movement sequence;
    a target comprising a rotatable strike pad supported above a plane connecting said starting and landing pads and axially displaced from said starting and landing pads when said starting and landing pads are axially displaced from one another; and a beam elongated in the direction of said axis and connecting said starting pad, said landing pad, and said target.

14. The training apparatus claimed in claim 13, wherein said strike pad is rotatable about an axis parallel to said plane.

15. The training apparatus claimed in claim 14, wherein:
said target comprises two target support posts;
said strike pad has a generally planar shape; and
said strike pad is disposed between said target support posts and rotates on an axle extending between said target support posts.

16. The training apparatus claimed in claim 15, wherein each said target support post comprises a height adjustor.

17. The training apparatus claimed in claim 15, further comprising a generally planar posture guide extending above said plane.

18. The training apparatus claimed in claim 17, wherein said posture guide comprises a mesh screen.

19. The training apparatus claimed in claim 17, wherein said posture guide comprises an angle adjustor for selectably orienting at least a portion of it at an angle with respect to said plane.

20. The training apparatus claimed in claim 19, wherein said angle adjustor comprises a ratcheting mechanism.

21. A training apparatus for an athlete, comprising:
a beam elongated in the direction of an axis;
a starting platform connected to said beam and having a generally planar upper surface;
a landing platform connected to said beam and having a generally planar upper surface, said landing platform axially displaced from said starting platform along said beam;
a target connected to said beam and comprising a strike pad supported above said beam, said target axially displaced from said starting and landing platforms along said beam; and
a posture guide connected to said beam and extending above said beam.

22. The apparatus claimed in claim 21, further comprising a simulated baseball pitcher's rubber on said starting platform.

23. The training apparatus claimed in claim 22, wherein:
said target comprises two target support posts;
said strike pad has a generally planar shape; and
said strike pad is disposed between said target support posts and rotates on an axle extending between said target support posts and through said strike pad.

24. The training apparatus claimed in claim 21, wherein said strike pad is rotatable about an axis parallel to said beam.

25. The training apparatus claimed in claim 21, wherein said posture guide comprises a mesh screen.

26. The training apparatus claimed in claim 21, wherein said posture guide comprises an angle adjustor for selectably orienting at least a portion of it at an angle with respect to a plane connecting said starting and landing platforms.

27. The training apparatus claimed in claim 26, wherein said angle adjustor comprises a ratcheting mechanism.

28. A method for training an athlete, comprising the steps of:
said athlete standing on a starting platform having a generally planar upper surface and connected to a beam elongated in a direction of an axis while gripping an implement;
said athlete stepping in an axial direction along said beam from said starting platform onto a landing platform having a generally planar upper surface; and
said athlete striking with said implement a target connected to said beam and supported above said beam while said implement remains gripped by said athlete.

29. The method claimed in claim 28, wherein said implement is made of a pliable sheet-like material.

30. The method claimed in claim 29, wherein said implement is made of cloth.

31. A method for producing a training device for an athlete, comprising the steps of:
disposing a starting platform at a starting position;
disposing a landing platform at a landing position spaced from said starting position;
disposing a target at a position collinear with said starting and landing positions and spaced from said starting and landing platforms along an axis, said target having a strike pad supported above a plane connecting said starting and landing platforms; and
connecting said starting platform, said landing platform and said target to a beam oriented along said axis.

* * * * *